(12) United States Patent
Okumura et al.

(10) Patent No.: US 6,260,281 B1
(45) Date of Patent: Jul. 17, 2001

(54) BLADE MOUNTING DEVICES FOR RECIPROCATING CUTTING TOOLS

(75) Inventors: Michio Okumura; Mitsuyoshi Niinomi; Shinsuke Mori, all of Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/469,616

(22) Filed: Dec. 22, 1999

(30) Foreign Application Priority Data

Dec. 24, 1998 (JP) .................................................. 10-367785

(51) Int. Cl.$^7$ .................................................. B23D 49/04
(52) U.S. Cl. ................................ 30/392; 30/337; 279/75; 279/904; 279/905
(58) Field of Search ........................ 30/337, 392; 279/75, 279/904, 905

(56) References Cited

U.S. PATENT DOCUMENTS

| | | | |
|---|---|---|---|
| 3,750,283 | * | 8/1973 | Hoffman ................................ 30/392 |
| 4,285,129 | * | 8/1981 | Hoffman ................................ 30/392 |
| 4,299,402 | * | 11/1981 | Hoffman ................................ 30/337 |
| 4,351,112 | * | 9/1982 | Nalley ..................................... 30/392 |
| 4,441,255 | * | 4/1984 | Hoffman ................................ 30/392 |
| 4,528,753 | * | 7/1985 | Kuhlmann et al. .................... 30/392 |
| 5,322,302 | * | 6/1994 | Quirijnen ............................... 30/392 |
| 5,443,276 | | 8/1995 | Nasser et al. . |
| 5,573,255 | * | 11/1996 | Salpaka ................................... 30/392 |
| 5,575,071 | | 11/1996 | Phillips et al. . |
| 5,647,133 | | 7/1997 | Dassoulas . |
| 5,903,983 | * | 5/1999 | Jungmann et al. .................... 30/392 |
| 6,009,627 | * | 1/2000 | Dassoulas et al. ..................... 30/392 |

FOREIGN PATENT DOCUMENTS 4-109101 9/1992 (JP) .

* cited by examiner

*Primary Examiner*—M. Rachuba
(74) *Attorney, Agent, or Firm*—Dennison, Scheiner, Schultz & Wakeman

(57) ABSTRACT

A device for mounting a blade on a reciprocally movable blade carrier of a cutting tool includes a blade pressing member and a blade pressing surface formed on the blade carrier, so that the blade can be pressed against the blade pressing surface by the blade pressing member. A retainer member serves as a guide for the pressing member, so that the pressing member can move in a direction substantially perpendicular to the pressing surface between a first position for pressing the blade against the pressing surface and a second position for releasing the pressing force of the pressing member. An operation member is shiftable relative to the blade carrier and is operable by an operator for moving the pressing member between the first position and the second position. A ball is interposed between the pressing member and the operation member. A contacting surface is formed on the operation member, so that the ball can roll along the contacting surface.

23 Claims, 3 Drawing Sheets

BLADE MOUNTING DEVICES FOR RECIPROCATING CUTTING TOOLS

BACKGROUND OF THE INVENTION

1. Field of the Invention

The present invention relates to devices for mounting blades on reciprocating cutting tools, such as power reciprocating saws and jig saws.

2. Description of the Related Art

A known device for mounting saw blades on a jig saw is taught in Japanese Laid-Open Utility Model Publication No. 4-109101. The mounting device of this publication includes an operation member that can be rotated by an operator for tightening and loosening a blade by means of a thread mechanism. However, such rotating operations for tightening and loosening the blade are cumbersome and inconvenient.

SUMMARY OF THE INVENTION

It is, accordingly, an object of the present invention to teach a device for mounting blades on cutting tools, in which the blades can be easily mounted on and removed from the cutting tools.

According to the present invention, a device for mounting a blade on a blade carrier of a cutting tool is taught that includes a blade pressing member for pressing the blade against a surface of the blade carrier. The blade carrier may be, for example, a reciprocating drive shaft of a power saw. A retainer member may serve as a guide for the pressing member, such that the pressing member can move between a first position, in which the blade is pressed against the surface to fix the blade to the blade carrier, and a second position, in which the pressing force of the pressing member is released and the blade can be removed from the blade carrier. An operation member may be operable by an operator to move the pressing member between the first position and the second position by means of a ball that can roll along a contacting surface formed on the operation member.

Therefore, when the operator shifts the operation member in one direction, the pressing member will press the blade against the blade carrier. On the other hand, when the operator shifts the operation member in the opposite direction, the pressing member may move from the first position to the second position to thereby release the blade from the blade carrier.

Because the blade can be mounted on and removed from the blade carrier by the shifting movement of the operation member, the mounting and removing operation of the blade can be easily performed. Therefore, the operability of the blade mounting device can be improved.

Other objects, features and advantages of the present invention will be readily understood after reading the following detailed description together with the accompanying drawings and the claims.

DETAILED DESCRIPTION OF THE INVENTION

Figure 1:
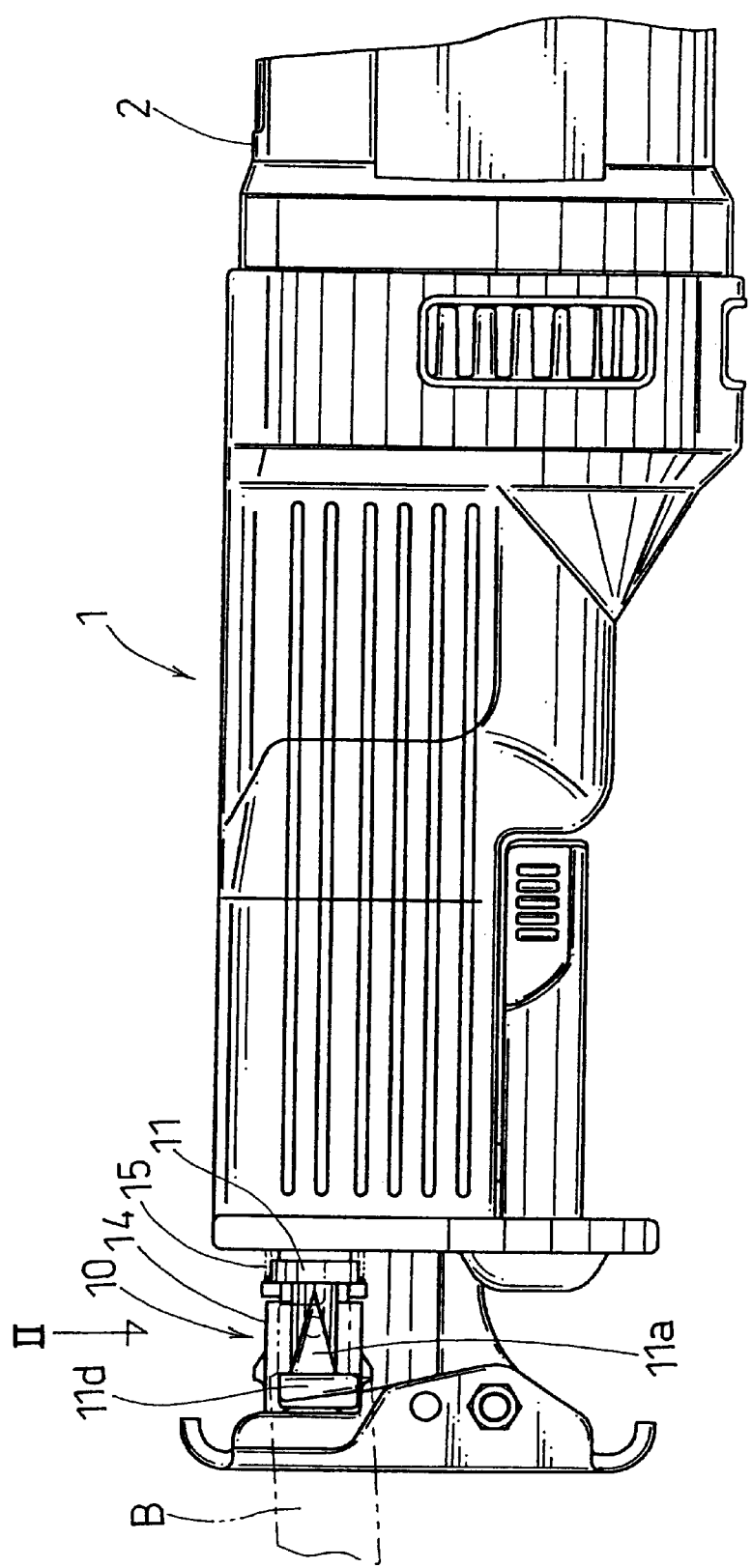
FIG. 1 is a side view of a representative power reciprocating saw having an improved blade mounting device.

Blade mounting devices are taught that permit a removable blade to be easily and quickly attached to a cutting tool. Preferably, the blade mounting device can be manually operated without the use of any tools by sliding an operation member between a blade retaining position and a blade releasing position.

In a representative embodiment of the present invention, the operation member can slide relative to the blade carrier for the cutting tool in a first direction that is substantially parallel to the blade carrier. In this connection, a ball contacting surface formed on the operation member may extend in a second direction that is inclined relative to the first direction. A ball is disposed between the operation member and the blade to transmit a blade retaining force to the blade via a pressing member. In this embodiment, the operator can smoothly move the operation member, while the ball rolls along the contacting surface to move the pressing member toward and away from the blade carrier surface.

Preferably, the contacting surface includes a guide recess that extends in the second direction. The guide recess may have a substantially arc shaped cross section within a plane that is perpendicular to the second direction. Therefore, the ball can smoothly and reliably roll in the second direction along the contacting surface, so that the operating force to move the pressing member can be further reduced.

Further, the contacting surface may include a substantially spherical engaging recess that is formed at one end of the guide recess. The engaging recess may have a radius of curvature that is substantially the same radius of curvature as the ball. The ball may rest in the engaging recess when the pressing member is in the blade releasing position. Therefore, the ball and the pressing member can be held in a fixed position when the pressing member is in the blade releasing position.

In another representative embodiment, the device may include a biasing means, such as a spring, that biases the operation member to move the pressing member from the blade releasing position toward the blade retaining position. As a result, the pressing member can reliably be held in the blade retaining position to fix the blade to the blade carrier when no external force is applied to the operation member. In addition, the pressing member can automatically return from the blade releasing position to the blade retaining position when the operator releases the operation member.

Preferably, the pressing member has an end surface for contacting the ball, which end surface may have a spherical concave recess that has a radius of curvature greater than the radius of curvature of the ball. Therefore, the ball also can roll along the concave recess of the pressing member. As a result, frictional forces that may be produced against the shifting movement of the operation member can further be reduced. Therefore, the operator can easily shift the operation member for the blade mounting and removing operations.

In a further representative embodiment, the retainer member includes a guide hole that receives the pressing member and the ball, such that the pressing member and the ball can move in a direction substantially perpendicular to the blade carrier surface.

Preferably, the guide hole has a diameter greater than the diameter of the ball, so that the ball can move in the diametrical direction of the guide hole within a predetermined range. Therefore, the ball can roll along the concave surface within the guide hole, so that the ball can roll smoothly. In addition, because the ball may also move in the direction toward the pressing member or the direction toward the blade carrier surface as the ball rolls along the concave surface, the distance that the pressing member moves can be increased.

Further, an engaging mechanism may serve to prevent the pressing member from being removed from the guide hole. As a result, the pressing member can reliably be retained within the guide hole.

In another representative embodiment, the device may include a blade insertion recess for receiving the blade formed in the blade carrier. The blade insertion recess may define a surface of the blade carrier that contacts the ball and the pressing surface and may have a blade biasing device disposed therein for normally biasing the blade in a direction from the insertion recess that permits blade removal. Therefore, when the pressing member is moved from the blade retaining position to the blade releasing position, the blade may automatically be ejected from the blade insertion recess.

Preferably, the pressing member has a substantially truncated conical end that can engage a mounting hole formed in the blade, so that the pressing member can be used with various types of blades that have different thickness.

Each of the additional features and method steps disclosed above and below may be utilized separately or in conjunction with other features and method steps to provide improved blade mounting devices and methods for designing and using such blade mounting devices. A representative example of the present invention, which example utilizes many of these additional features and method steps in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe a representative example of the invention.

A representative embodiment of a blade mounting device will now be described with reference to the drawings. FIG. 1 illustrates a side view of a power reciprocating saw 1 that incorporates a representative embodiment of a blade mounting device 10.

Figure 2:
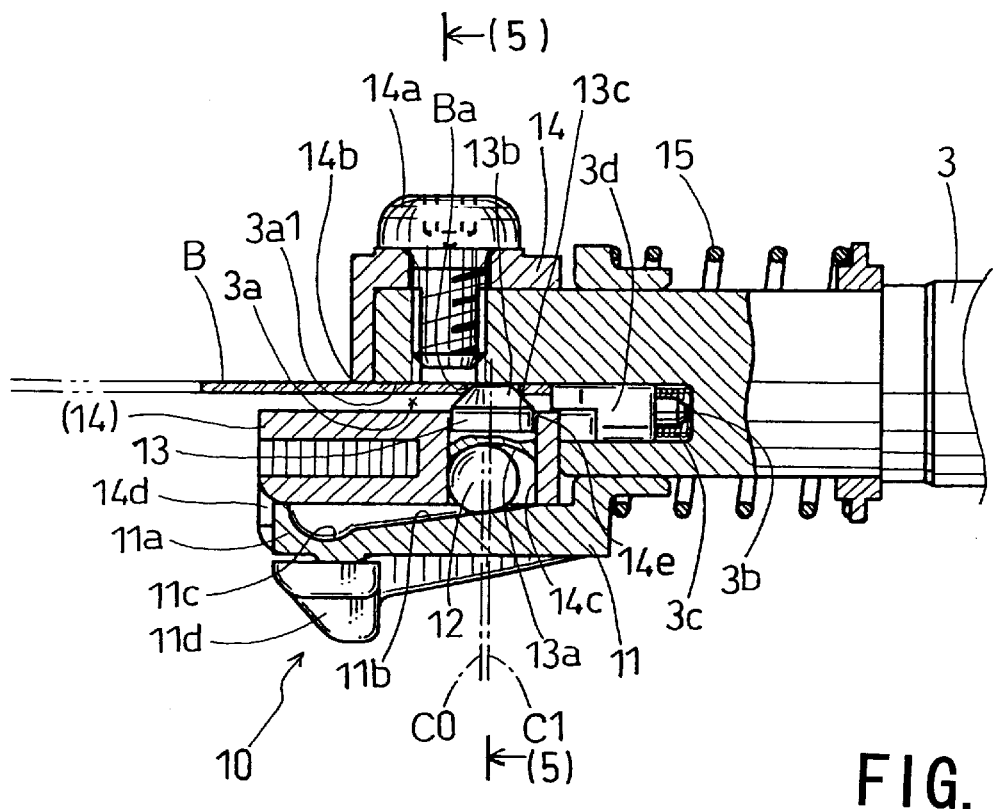
FIG. 2 is a horizontal sectional view as viewed in the direction of arrow It of the blade mounting device and showing the blade in a mounted state.
Figure 3:
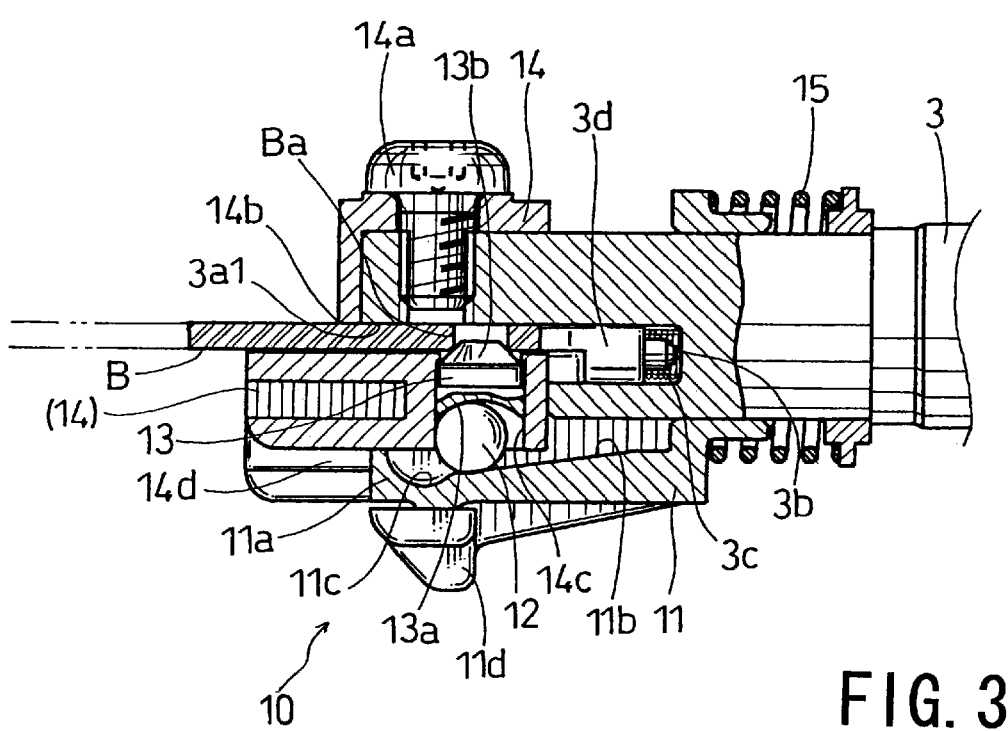
FIG. 3 is a sectional view similar to FIG. 2, except that the saw blade has a greater thickness than the blade shown in FIG. 2.
Figure 4:
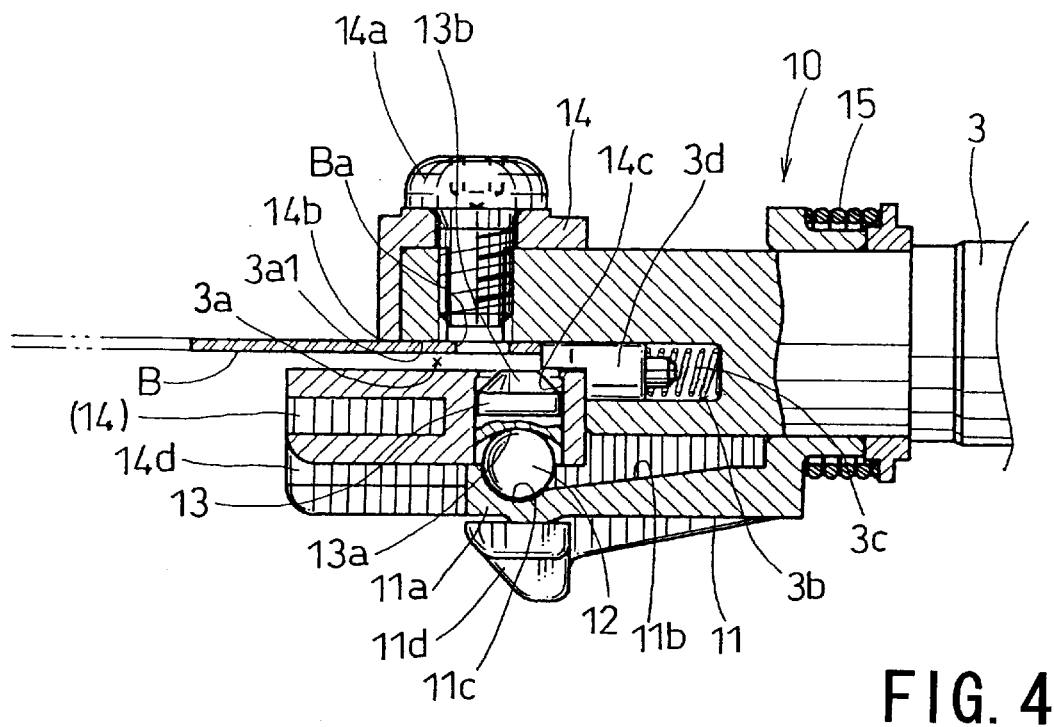
FIG. 4 is a sectional view similar to FIG. 2, except that the operation member has been shifted to permit the saw blade to be removed.

The reciprocating saw 1 may generally comprise a body 2 and a reciprocating drive shaft 3 (see FIGS. 2 to 5) that is slidably received within the body 2, so that the reciprocating drive shaft 3 can move relative to the body 1 in right and left directions as viewed in FIGS. 2 to 4. The reciprocating drive shaft 3 may be reciprocally driven by a motor (not shown) that is disposed within the body 2, and a motion converting mechanism (not shown) may convert the rotation of the motor into the reciprocal movement of the reciprocating drive shaft 3.

The blade mounting device 10 may be disposed on the front end (left end as viewed in FIG. 1) of the reciprocating drive shaft 3 and may fix a blade B in position relative to the reciprocating drive shaft 3. Preferably, the front end of the reciprocating drive shaft 3 has a recess 3a formed in the reciprocating direction or the longitudinal direction of the reciprocating drive shaft 3. A flat blade contacting surface 3a1 may be formed on the upper side of the recess 3a as viewed in FIG. 2. Thus, in the mounting state, a portion of the surface of the blade B can be forcibly pressed against the flat blade contacting surface 3a1, such that the blade B is disposed in parallel to and in the longitudinal direction of the reciprocating drive shaft 3.

The recess 3a may have a terminal portion 3b that receives a support member 3d and a compression spring 3c. The compressing spring 3c may bias the support member 3d in the forward direction (leftward as viewed in FIG. 2). When the saw blade B is mounted, the front end of support member 3d contacts the rear end of the saw blade B and the compression spring 3c is compressed. Therefore, when the pressing force or the fixing force applied to the saw blade B has been released, the saw blade B will be ejected forward by the biasing force of the compression spring 3c. Therefore, the saw blade B can be easily removed from the recess 3a.

The blade mounting device 10 may include, for example, an operation member 11, a ball 12, a blade pressing member 13 and a retainer member 14.

Figure 5:
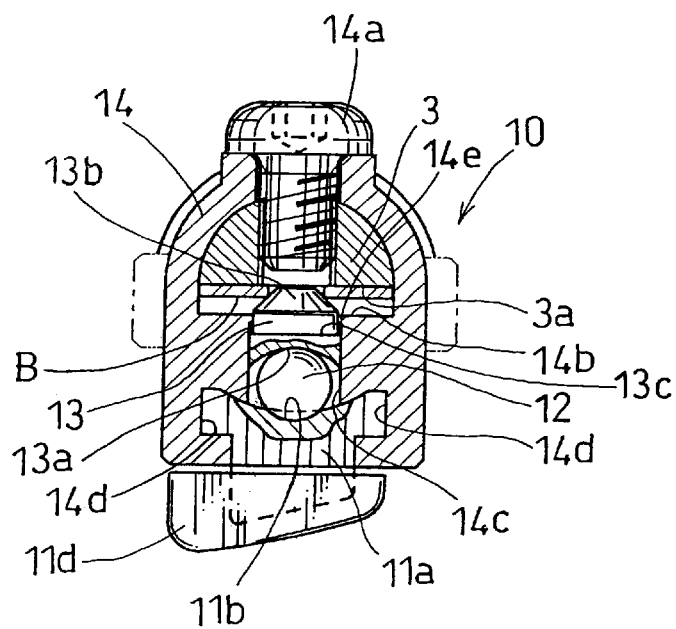
FIG. 5 is a sectional taken along line (5)—(5) in FIG. 2.

The operation member 11 may be mounted on the reciprocating drive shaft 3 and may slide along the reciprocating drive shaft 3 in the longitudinal direction of the reciprocating drive shaft 3. The operation member 11 may have an arm portion 11a. The arm portion 11a may be formed on the lower side of the operation member 11 and may extend forwardly from the operation member 11. A ball guide recess 11b may be formed on an upper surface of the arm portion 11a. The guide recess 11b may partially receive the ball 12 and may incline downward in the forward direction by a small angle. The ball guide recess 11b may have a concave central portion as viewed in vertical cross section, and the curvature of the central portion is preferably substantially the same curvature as the ball 12, as shown in FIG. 5.

A ball engaging recess 11c may be formed at the front end of the guide recess 11b and may have a concave configuration that substantially conforms to a portion of the outer surface of the ball 12. The engaging recess 11c may have a depth that is greater than the depth of the guide recess 11b so as to retain the ball 12 within the engaging recess 11c.

A protrusion 11d may be formed on the lower side of the front end of the arm portion 11a. Therefore, the operator can easily slide the operation member 11 by grasping the protrusion 11d with his fingers.

The retainer member 14 may be secured to the front end of the reciprocating drive shaft 3 by means of a screw 14a and may have an insertion slot 14b at the front portion. The insertion slot 14b may be aligned with the recess 3a formed in the reciprocating drive shaft 3, so that the blade B can be inserted into the recess 3a through the insertion slot 14b.

A vertical guide hole 14c may be formed in the retainer member 14 and may provide a vertical guide for the ball 12 and the pressing member 13. Thus, the ball 12 may be received within the guide hole 14c and may partially protrude from the lower portion of the guide hole 14c, so that the lower side of the ball 12 can contact the guide recess 11b or the engaging recess 11c of the arm portion 11a. Preferably, the diameter of the guide hole 14c is chosen to be substantially the same the diameter as the pressing member 13, so that the pressing member 13 can move vertically within the guide hole 14c without rattling. However, the diameter of the guide hole 14c as well as the diameter of the pressing member 13 may be chosen to be greater than the diameter of the ball 12. Therefore, the ball 12 also can be permitted to move relative to the guide hole 14c by a predetermined range in the diametrical direction of the guide hole 14c. The upper end of the guide hole 14c may open to the recess 3a of the reciprocating drive shaft 3 and may be opposite to the pressing surface 3a1. On the other hand, the lower end of the guide hole 14c may open to the guide recess 11b of the arm portion 11a of the operation member 11.

The lower portion of the retainer member 14 may be recessed to form a pair of parallel liner guide recesses 14d that engage the arm portion 11a, so that the arm portion 11a can slide in a linear manner along the guide recesses 14d.

The pressing member 13 may have an upper end 13b that is tapered upward to have a truncated conical configuration. The upper end 13b can be inserted into a mounting hole Ba formed in one end (right end as viewed in FIG. 2) of the blade B so as to apply a pressing force to the end portion of the blade B thereby pressing the blade B against the pressing surface 3a1 and preventing the blade B from being removed from the reciprocating drive shaft 3.

In order to provide such a pressing and removal prevention force, a compression spring 15 may be provided between the reciprocating drive shaft 3 and the operation member 11. Thus, the biasing force of the compression spring 15 may be transmitted from the operation member 11 to the pressing member 13 via the ball 12 so as to as bias the pressing member 13 upward. This operation will be further explained below.

Preferably, a spherical concave surface 13a is formed on the lower end of the pressing member 13, to which the ball 12 contacts. The concave surface 13a may have a radius of curvature that is greater than the radius of curvature of the ball 12.

In addition, a stepped portion 13c may be formed on the pressing member 13 at substantially the middle position, so that the upper half of the pressing member 13 is slightly smaller than the lower half. In addition, an annular flange 14e may be formed within the upper end of the guide hole 14c so as to protrude into the guide hole 14c. As a result, the pressing member 13 cannot be removed upward from the upper side of the guide hole 14c, because the stepped portion 13c will contact and be stopped by the annular flange 14e.

The operation of the above representative embodiment of the mounting device 10 will now be explained in further detail.

As described above, the operation member 11 is normally biased forwardly (in the left direction as viewed in FIG. 2) by the compression spring 15. In addition, the guide recess 11b of the arm portion 11a of the operation member 11 is inclined downward in the forward direction. Further, the ball 12 is positioned within the guide hole 14c and the lower side of the ball 12 rests in the guide recess 11b. Therefore, the biasing force of the compression spring 15 is converted into an upward biasing force that is applied to the ball 12. Consequently, the pressing member 13 is forced upward toward the pressing surface 3a1 of the reciprocating drive shaft 3.

Therefore, when the blade B is mounted on the reciprocating drive shaft 3, as shown in FIG. 2, the truncated conical upper end 13b of the pressing member 13 forcibly engages the lower peripheral edge of the mounting hole Ba of the blade B and presses the end portion of the blade B against the pressing surface 3a. This state exists when the operation member 11 is held in the leftward shifted position.

If the operation member 11 is moved to the left side, as shown in FIG. 2, the ball 12 is positioned in the upper portion of the guide hole 14c. Therefore, the pressing member 13 is moved upward toward the pressing surface 3a1. As a result, the upper end 13b of the pressing member 13 is pressed into mounting hole Ba of the blade B and engages the peripheral portion of the mounting hole Ba.

FIG. 3 shows a mounted blade B having a thickness that is larger than the blade B shown in FIG. 2. As will be seen from FIGS. 2 and 3, when the blade B is mounted on or fixed to the blade mounting device 10, the horizontal position of the operation member 11 as well as the amount of the upper end 13b of the pressing member 13 that protrudes from the guide hole 14c may vary in response to the thickness of the blade B. However, in either case, the blade B can reliably be mounted on the front portion of the reciprocating drive shaft 3.

In order to remove the blade B from the reciprocating drive shaft 3, the operator may pull or retract the operation member 11 rearward (rightward as viewed in FIGS. 2 or 3) against the biasing force of the compression spring 15. Therefore, the arm portion 11a also moves in the rearward direction relative to the ball 12. As a result, the ball 12 rolls leftward along the guide recess 11b relative to the arm portion 11a. Because the guide recess 11b is inclined downward in the forward direction, the ball 12 may move downward relative to the guide hole 14c to increase the amount that protrudes from the guide hole 14c.

Incidentally, because the compression spring 3c is compressed when the blade B is mounted, the blade B is normally biased in the forward direction by the compression spring 3c. On the other hand, the truncated conical upper end 13b of the pressing member 13 contacts the lower peripheral edge of the mounting hole Ba. Therefore, the biasing force of the compression spring 3c is converted into a downward biasing force that may be applied to the pressing member 13 and then to the ball 12. Therefore, the pressing member 13 and the ball 12 are forced to move downward as the ball 12 moves forward along the guide recess 11b as described above.

When the operation member 11 is further shifted to the right, as shown in FIG. 4, the ball 12 reaches the ball engaging recess 11c at the front end of the guide recess 11b. In this position, the pressing member 13 and the ball 12 reach their lowermost positions, in which the upper end 13b of the pressing member 13 is substantially withdrawn into the guide hole 14c. Therefore, the pressing member 13 is removed from the mounting hole Ba of the blade B, and the blade B can be ejected forwardly from the reciprocating drive shaft 3 by the biasing force of the compression spring 3c.

In order to remount the blade B on the reciprocating drive shaft 3, with the operation member 11 held in the position shown in FIG. 4, the operator inserts the end portion of the blade B into the recess 3a of the reciprocating drive shaft 3 via the insertion slot 14b and then presses the end portion of the blade B against the support member 3d to move the support member 3d rearward against the biasing force of the compression spring 3c. Then, the operator releases the operation member 11 (the operator stops biasing the protrusion 11d in the rearward direction). As a result, the operation member 11 automatically moves leftward by the biasing force of the compression spring 15. Therefore, the ball 12 and the pressing member 13 are pushed upward within the guide hole 14c to again engage the mounting hole Ba of the blade B and to press the end portion of the blade B against the pressing surface 3a1 of the reciprocating drive shaft 3.

As described above, according to this representative embodiment of the blade mounting device 10, the blade B can be easily mounted on and removed from the reciprocating drive shaft 3 by sliding the operation member 11 in a linear manner. Therefore, the blade mounting device 10 is easier to use compared to known blade mounting devices.

Further, in this representative embodiment of the blade mounting device 10, the ball 12 can move relative to the guide hole 14c in the forward and rearward directions within a predetermined range. Therefore, the ball 12 can roll along both the guide recess 11b of the operation member 11 and the spherical concave surface 13a of the pressing member 13. Therefore, during the sliding operation of the operation member 11, frictional forces between the ball 12 and the guide recess 11b and between the ball 12 and the concave surface 13a can be substantially reduced. Thus, frictional forces only result from the rolling resistances. Therefore, the operation member 11 can be shifted by using a small force, further improving the ease of use.

Moreover, because the radius of curvature of the concave surface 13a is greater than the radius of curvature of the ball 12, the ball 12 can smoothly roll along the concave surface 13a of the lower end of the pressing member 13. In particular, the operator can easily shift the operation member 11 to remove the blade B. Thus, in the mounting state shown in FIG. 2, the ball 12 receives the biasing force of the compression spring 15 from the inclined guide recess 11b of the operation member 11. Therefore, in this state, the ball 12 is held in a position, in which the ball 12 contacts the front portion of the inner peripheral surface of the guide recess 11b, or in which vertical central line C0 of the ball 12 is displaced forward (leftward as viewed in FIG. 2) from vertical central line C1 of the concave surface 13a of the pressing member 13 or the central axis of the pressing member 13. As a result, when the operator moves the operation member 11 rearward against the biasing force of the compression spring 15, the ball 12 can smoothly roll rearward within the guide hole 14c along the concave surface 13a from a higher position to a lower position.

Finally, the distance that the pressing member 13 moves in the axial direction or the direction perpendicular to the pressing surface 3a1 of the reciprocating drive shaft 3 is the sum of the distance that the ball 12 moves in the vertical direction along the guide recess 11b and the distance that the ball 12 moves in the vertical direction along the concave surface 13a. Therefore, the pressing member 13 can vertically move by a relatively large distance as a result of by a small movement of the operation member 11. Therefore, the representative embodiment of the blade mounting device 10 is improved also in this respect.

The above representative embodiment may be modified in various ways. For example, the concave surface 13a at the lower end of the pressing member 13 may be replaced by any other surface configurations, such as a flat surface, as long as such surfaces permit the ball 12 to smoothly roll in response to the sliding movement of the operation member 11.

Further, although the present invention has been described in connection with a representative embodiment of a blade mounting device that is incorporated into a power reciprocating saw, the present invention can be applied to any other types of reciprocating tools, such as jig saws.

What is claimed is:

1. A device for mounting a blade on a blade carrier of a cutting tool, comprising:

a blade pressing member; a blade pressing surface formed on the blade carrier, so that the blade can be pressed against the blade pressing surface by the blade pressing member;

a retainer member for providing a guide for the pressing member, so that the pressing member can move in a direction substantially perpendicular to the pressing surface between a pressing position for pressing the blade against the pressing surface and a releasing position for releasing the pressing force of the pressing member;

an operation member shiftable relative to the blade carrier and operable by an operator for moving the pressing member between the pressing position and the releasing position;

a ball interposed between the pressing member and the operation member; and a contacting surface formed on the operation member, so that the ball can roll along the contacting surface.

2. The device as defined in claim 1 wherein the operation member is slidably movable relative to the blade carrier in a first direction substantially parallel to the pressing surface, and the contacting surface extends in a second direction that is inclined relative to the first direction.

3. The device as defined in claim 2 wherein the contacting surface includes a guide recess that extends in the second direction, the guide recess having a substantially arc shaped cross section within a plane that is perpendicular to the second direction.

4. The device as defined in claim 3 wherein the contacting surface further includes a substantially spherical engaging recess formed at one end of the guide recess and having a radius of curvature that is substantially the same as the radius of curvature of the ball, the ball being engageable with the engaging recess when the pressing member is in the releasing position.

5. The device as defined in claim 1 further including a spring that biases the operation member in such a direction that the pressing member moves from the releasing position toward the pressing position.

6. The device as defined in claim 1 wherein the pressing member has an end surface that contacts the ball, the end surface having a spherical concave recess that has a radius of curvature that is greater than the radius of curvature of the ball.

7. The device as defined in claim 6 wherein the retainer member includes a guide hole that receives the pressing member and the ball such that the pressing member and the ball are movable in a direction substantially perpendicular to the pressing surface.

8. The device as defined in claim 7 wherein the guide hole has a diameter greater than the diameter of the ball, so that the ball can move in the diametrical direction of the guide hole within a predetermined range.

9. The device as defined in claim 7 further including an engaging mechanism for preventing the pressing member from being removed from the guide hole.

10. The device as defined in claim 1 further including a blade insertion recess for receiving the blade formed in the blade carrier, the blade insertion recess defining the pressing surface and having a blade biasing device disposed therein for normally biasing the blade in a removing direction from the insertion recess.

11. The device as defined in claim 1 wherein the pressing member has a substantially truncated conical end that is engageable with a mounting hole formed in the blade.

12. A tool, comprising:

a blade, a blade carrier having a surface that contacts the blade and a blade mounting device, comprising:

a retainer member having a passage, the retainer member being mounted on the blade carrier, a blade contacting member disposed within the retainer member passage, wherein the blade contacting member can move in a direction substantially perpendicular to the blade contacting surface between a first position, in which the blade pressed against the blade contacting surface and a second position, in which the blade can be removed from the blade mounting device;

a ball and an operation member that can slide relative to the blade carrier and is coupled to the blade contacting member via the ball, wherein sliding the operation member can move the blade contacting member between the first position and the second position, wherein the ball rolls along a contacting surface formed on the operation member.

13. The tool as defined in claim 12 wherein the operation member can slide relative to the blade carrier in a first direction that is substantially parallel to the blade contacting surface, and the contacting surface extends in a second direction that is inclined relative to the first direction.

14. The tool as defined in claim 13 wherein the contacting surface includes a guide recess that extends in the second direction, the guide recess having a substantially arc shaped cross-section within a plane that is perpendicular to the second direction.

15. The tool as defined in claim 14 wherein the contacting surface further includes a substantially spherical engaging recess formed at one end of the guide recess and having a radius of curvature that is substantially the same radius of curvature as the ball, wherein the ball can rest within the engaging recess when the blade contacting member is in the second position.

16. The tool as defined in claim 12 further including means for biasing the operation member in a direction such that the blade contacting member is biased toward the first position.

17. The tool as defined in claim 12 wherein the blade contacting member has an first surface that contacts the ball, which first surface has a spherical concave recess that has a radius of curvature that is greater than the radius of curvature of the ball.

18. The tool as defined in claim 17 wherein the retainer member includes a guide hole that receives the blade contacting member and the ball such that the blade contacting member and the ball can move in a direction substantially perpendicular to the blade contacting surface.

19. The tool as defined in claim 18 wherein the guide hole has a diameter that is greater than the diameter of the ball, so that the ball can move in the diametrical direction of the guide hole within a predetermined range.

20. The tool as defined in claim 18 further including means for preventing the blade contacting member from being removed from a portion of the guide hole that is closest to the blade contacting surface.

21. The tool as defined in claim 12 wherein the blade is received in a blade insertion recess formed in the blade carrier, which blade insertion recess defines the blade contacting surface and wherein a means for biasing the blade is disposed within the blade insertion recess for normally biasing the blade in a removing direction from the blade insertion recess.

22. The tool as defined in claim 12 wherein the blade contacting member has a substantially truncated conical end that can engage a mounting hole formed in the blade.

23. The tool as defined in claim 12 further comprising:

means for biasing the operation member in a direction such that the blade contacting member is biased toward the first position, means for preventing the blade contacting member from being removed from a portion of the guide hole that is closest to the blade contacting surface means for biasing the blade disposed within the blade insertion recess for normally biasing the blade in a removing direction from the blade insertion recess and wherein the operation member can slide relative to the blade carrier in a first direction that is substantially parallel to the blade contacting surface, and the contacting surface extends in a second direction that is inclined relative to the first direction, wherein the contacting surface includes a guide recess that extends in the second direction, the guide recess having a substantially arc shaped cross-section within a plane that is perpendicular to the second direction and the contacting surface further includes a substantially spherical engaging recess formed at one end of the guide recess and having a radius of curvature that is substantially the same radius of curvature as the ball, wherein the ball can rest within the engaging recess when the blade contacting member is in the second position, wherein the blade contacting member has an first surface that contacts the ball, which first surface has a spherical concave recess that has a radius of curvature that is greater than the radius of curvature of the ball, wherein the retainer member includes a guide hole that receives the blade contacting member and the ball, such that the blade contacting member and the ball can move in a direction substantially perpendicular to the blade contacting surface, wherein the guide hole has a diameter that is greater than the diameter of the ball, so that the ball can move in the diametrical direction of the guide hole within a predetermined range, wherein the blade is received in a blade insertion recess formed in the blade carrier, which blade insertion recess defines the blade contacting surface and wherein the blade contacting member has a substantially truncated conical end that an engage a mounting hole formed in the blade.

* * * * *